UNITED STATES PATENT OFFICE.

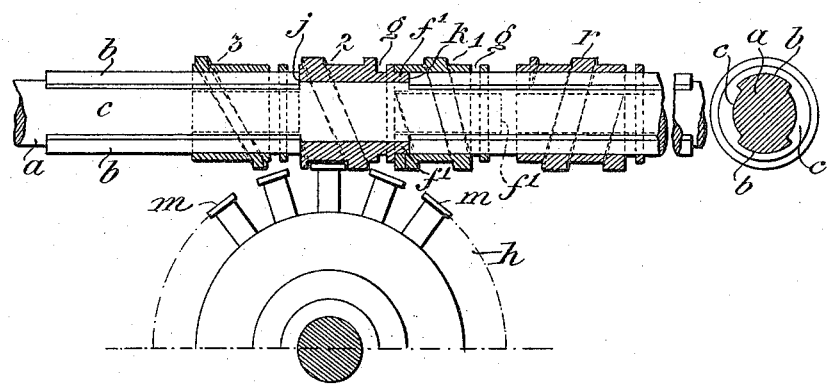
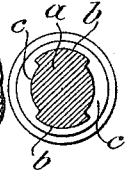
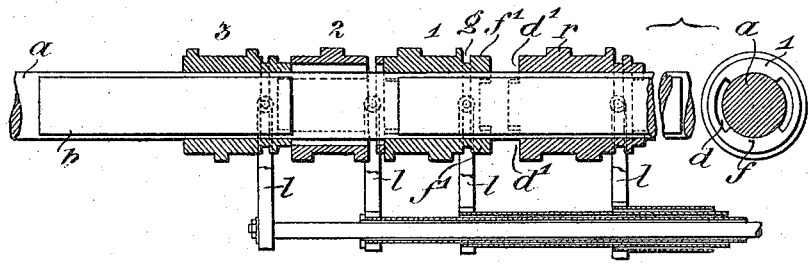
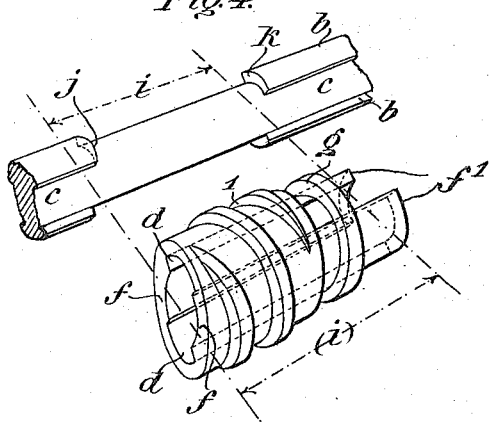

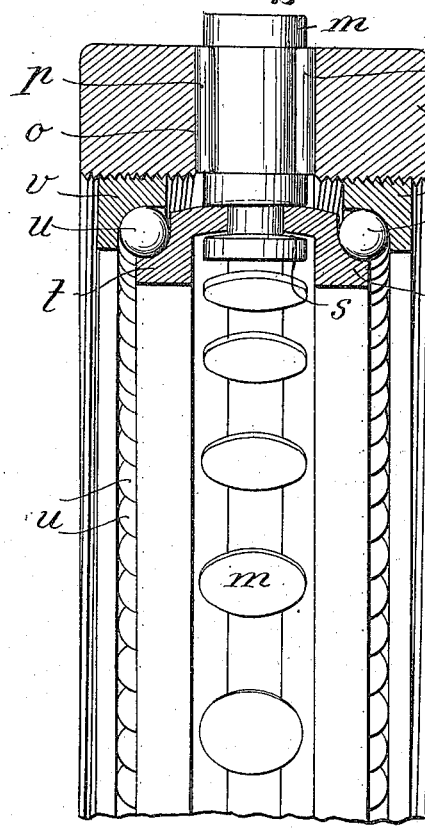
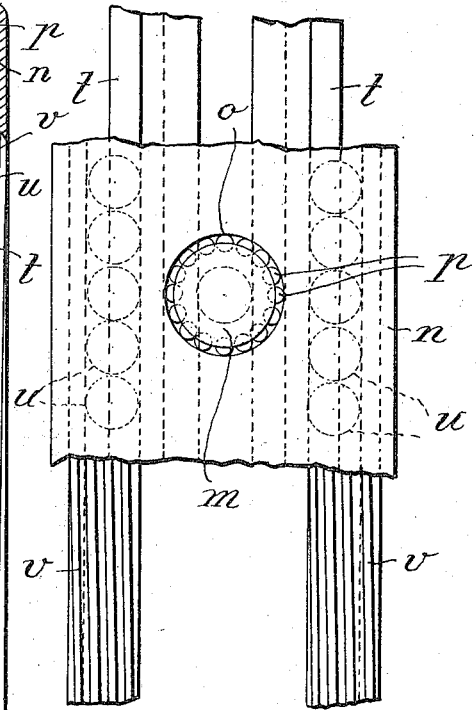
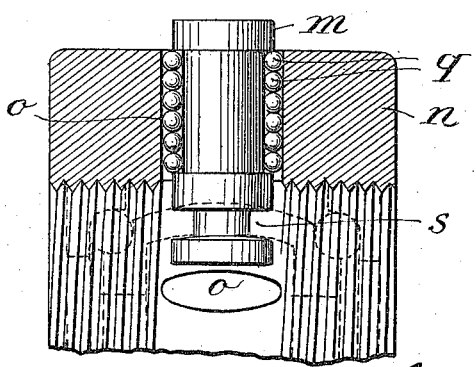

CAMILLUS KRUMPHOLZ AND EMIL PAUER, OF VIENNA, AUSTRIA-HUNGARY.

WORM-GEARING.

1,164,200.   Specification of Letters Patent.   Patented Dec. 14, 1915.

Application filed June 25, 1913. Serial No. 775,777.

*To all whom it may concern:*

Be it known that we, CAMILLUS KRUMPHOLZ and EMIL PAUER, subjects of the Emperor of Austria-Hungary, both residing at Margaretenstrasse 102, Vienna, V, Lower Austria, Austria-Hungary, have invented certain new and useful Improvements in Worm-Gearing, of which the following is a specification.

Our invention relates to a worm-gearing which uses a single worm wheel for altering the gear ratio and reversing the direction of motion. For this purpose a series of worms corresponding to the different gear ratios and to the reverse motion is shiftably arranged upon a shaft, said shaft as well as the worms being constructed in such manner that each of the worms can be brought in engagement with a common gear wheel provided with pin teeth, and can be locked in the engaged position upon the shaft. Conveniently the worm which is engaged at the time being, will be prevented from axial movement by the ends of longitudinal ledges or projections of the shaft and is connected with the shaft, by coupling with the adjacent worm, which is not in engaged position but is placed upon the ledges, in such manner that the said shaft transmits motion by means of the said adjacent worm to the engaged worm and to the worm or pin gear. By releasing the said adjacent worm from the engaged worm the latter can be revolved and then be disengaged or replaced by a neighboring worm which corresponds to another gear ratio or to reversing of motion. The pin teeth of the worm wheel are secured in the rim of the same so as to revolve easily and only with rolling friction, for which purpose special roller or ball bearings are provided.

Figures 1 and 2 of the annexed drawings show the improved worm gear in two longitudinal sections taken at right angles to each other. Fig. 3 is a cross section of the shaft. Fig. 4 shows one of the worms and the shaft in a perspective view. Fig. 5 shows a part of the worm wheel in an enlarged sectional view and Fig. 6 a part of the wheel rim in an elevation. Fig. 7 represents another form of execution comprising ball bearings.

The driving shaft $a$ is provided in the present case with two longitudinal ledges $b$, which are oppositely placed and extend in circumferential direction over an angle of 90°. Between the said longitudinal ledges $b$ are formed longitudinal recesses $c$. Upon the shaft $a$ are arranged, in the present case, three worms 1, 2 and 3 of different pitches corresponding to desired gear ratios, and a fourth worm $r$ for the reversed motion. The bore of the worms is formed, so as to correspond to the cross section of the shaft, and has therefore two enlargements $d$ oppositely arranged, which correspond to the ledges $b$ of the shaft. The inner ledges $f$ of the worms 1, 2 and 3 which ledges are positioned between the enlargements $d$ and project inwardly, are extended at one side, in the present case at the right hand side beyond the end of the worm so that two clutch projections $f'$ are formed which, at a distinct position of the worm, engage the enlargements $d$ of the bore of the worm 1, in the present case of the next adjacent worm at the right hand side.

The four worms are provided each with an annular groove $g$, which is engaged by the pins of a corresponding engaging fork $l$, by means of which the worm can be moved along the shaft without preventing the said worm from being revolved. Each of the four worms, 1, 2, 3 and $r$ can be thrown into engagement with a worm wheel $h$, which is common to all of the said worms and is provided with pin teeth.

The longitudinal ledges $b$ of the shaft are interrupted at the engaging place facing the worm wheel, about a distance which corresponds to the entire length of one worm including the clutch projections $f'$. Therefore the shaft has circular cross section at the said place. If one of the worms, in the present case the worm 2, is in engagement with the worm wheel $h$, the said worm engages with its inner ledges $f$ the circular part $i$ of the shaft so as to be capable of freely revolving about the shaft. In order to couple the said engaged worm with the shaft the worm 1, will be moved toward the engaged worm 2 and in a certain angular position of the last named worm 2 the two clutch projections $f'$ of the engaged worm 2 will engage the end parts of the enlargements $d$ of the neighbored worm 1, said end parts being not filled up by the shaft ledges $b$. The worm 1 being driven by the shaft drives by means of the clutch projections $f'$ the engaged worm 2 which transmits the motion to the worm or pin wheel. During this time the engaged worm 2 is closely confined at its inner ledges f and projections f' between the end faces of the ledges b of the shaft a, as indicated at j and k in Fig. 1, so that the said worm 2 is prevented from axial movement in either direction.

In order to release the engaged worm 2 and to bring the next worm (1) into engagement the latter worm is at first moved back from the engaging place (i) to such an extent that the projections f' of the engaged worm 2 are released. The said worm 2 can now freely revolve around the circular part of the shaft a. By revolving the said worm 2 in relation to the shaft about an angle of 90° or from there about 180° once or several times, the enlargements d of the said worm 2, are just in alinement with the ledges b of the shaft, so that by pressure of the engaging fork l the pins of the latter, which engage the annular groove of the worm 2, move the said worm along the shaft from the circular portion i of the shaft a upon the ledged part of the same, the worm 2 being now out of engagement. Then the next worm 1 previously moved back slightly as well as the following worms, in the example shown, the worm r, are moved in the same direction as the worm 2 by the fork l, until the worm 1 is entirely placed upon the circular shaft part i, whereupon the worm r is moved slightly in the same direction and is thereby coupled with the now engaged worm 1. The latter worm is now prevented from axial movement by the ends of the shaft ledges b, and so on. The same operation takes place in case, instead of the worm at the right hand side, as described, the worm at the lefthand side is to be thrown into engagement.

The number of worms is dependent upon the number of the different speeds to be obtained. The engaging forks l can be actuated in any known manner. In order to reduce the friction between the threads of the worms and the pins m of the worm wheel the said pins m are mounted in the rim n of the wheel in such manner that they can be easily revolved without any appreciable sliding friction. For this purpose the pins m are arranged within holes o of the rim and between a throat portion of the pin and the inner wall of the hole rollers p (Figs. 5 and 6) or balls q (Fig. 7) are interposed. The inner end of each pin, is provided with an annular groove s conveniently formed according to a spherical surface. At each side of the rim a ring t is provided which is also bulged or curved spherically and engages the annular grooves s of all pins. The two rings t are mounted upon balls u so as to be easily revoluble. The balls u run upon outer bearing rings v, which are removably secured to the wheel rim, and may conveniently be screwed as shown into the rim from both sides of the same.

The worm wheel is adapted for all cases in which it is desired that the pin teeth revolve, in order to minimize the friction which otherwise would be very considerable. The gear mechanism when in operation enables the pins m to revolve practically without friction upon the rollers p or balls q. The revolving pins cause the two rings t, which prevent the pins from moving in radial direction, to be turned in opposite directions also without friction upon the balls u. Therefore no appreciable sliding friction takes place, so that friction losses are greatly reduced.

Claim.

Worm gearing of the character described, comprising in combination, a driving shaft and a driven shaft, a plurality of juxtaposed worms having different pitches shiftably arranged upon said driving shaft, longitudinal ledges for coupling one of said worms to said shaft, means for coupling said worm to its adjacent worm, a pin wheel upon the driven shaft, meshing with said last named worm, and means for axially displacing said worms.

In testimony whereof we have hereunto set our hands in presence of two subscribing witnesses.

CAMILLUS KRUMPHOLZ.
EMIL PAUER.

Witnesses:
SIGMUND BAUER,
AUGUST FUGGER.

Copies of this patent may be obtained for five cents each, by addressing the "Commissioner of Patents, Washington, D. C."